Oct. 23, 1928.
J. R. LEWIS
1,688,724
ATTACHMENT FOR CHECK ROW CORN PLANTERS
Filed April 9, 1925      2 Sheets-Sheet 1
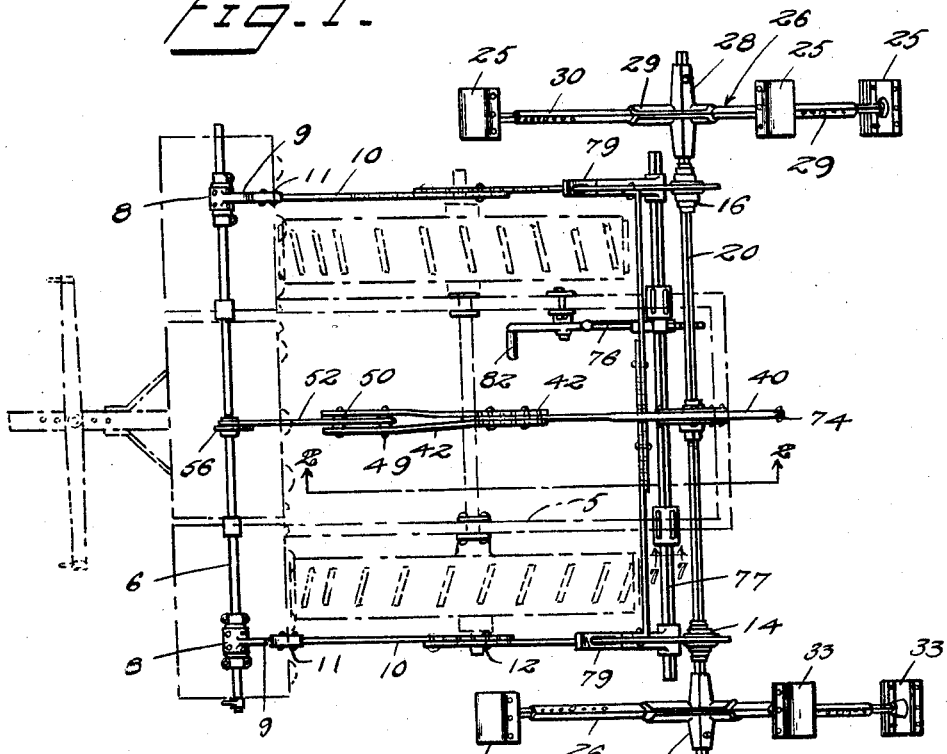
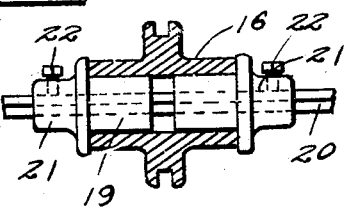
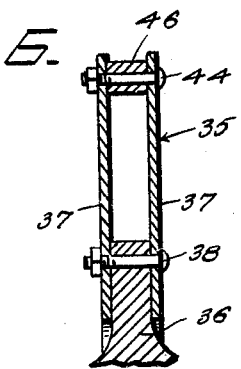
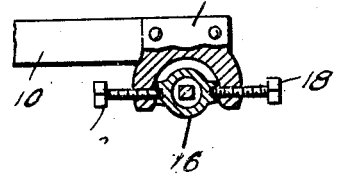
Inventor
Jasper R. Lewis Oct. 23, 1928.　　　　　　　　　　　　　　　　1,688,724
J. R. LEWIS
ATTACHMENT FOR CHECK ROW CORN PLANTERS
Filed April 9, 1925　　　2 Sheets-Sheet 2
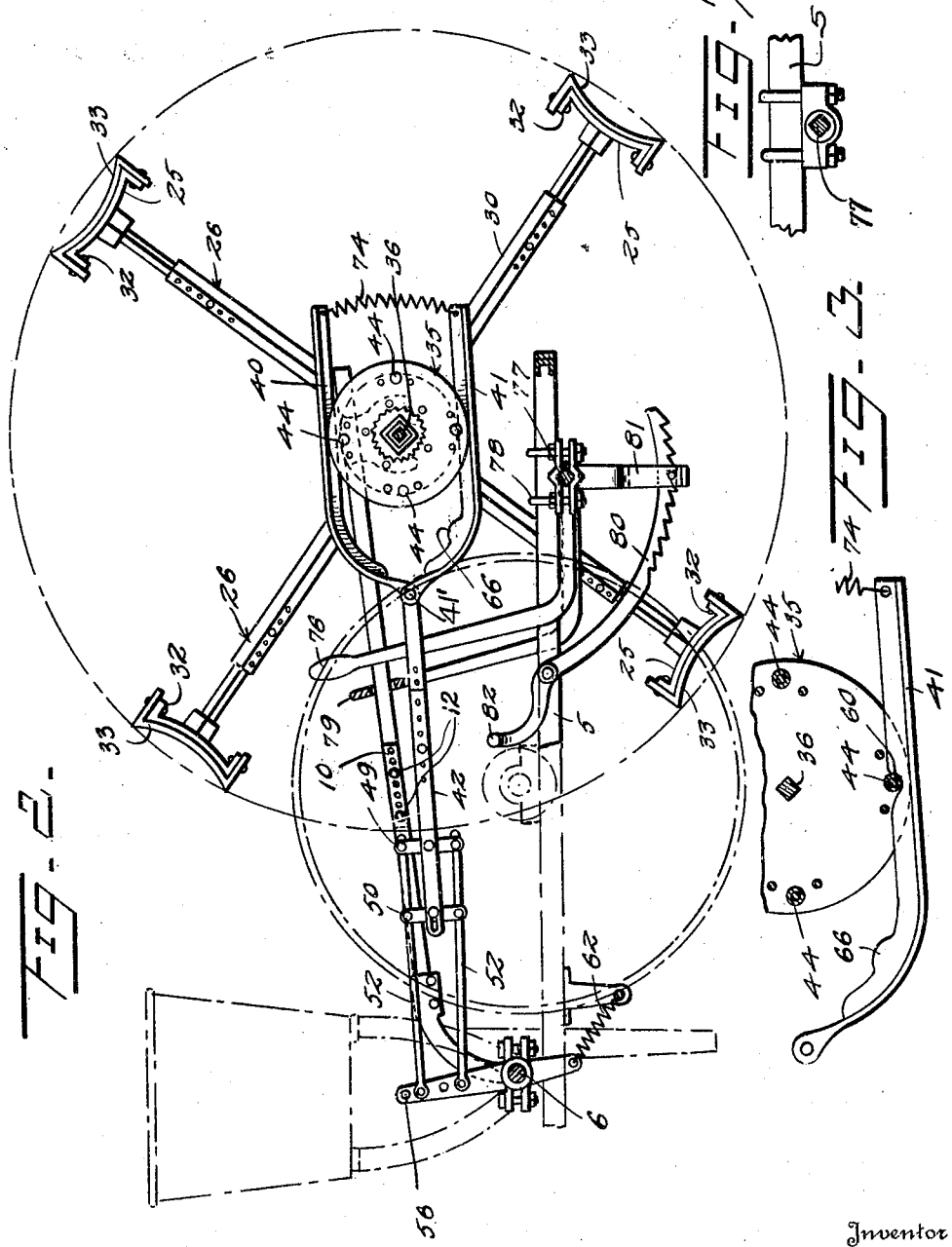
Inventor
Jasper R. Lewis Patented Oct. 23, 1928.

1,688,724

UNITED STATES PATENT OFFICE.

JASPER R. LEWIS, OF GRACE, MISSOURI.

ATTACHMENT FOR CHECK-ROW CORN PLANTERS.

Application filed April 9, 1925. Serial No. 21,867.

This invention relates to planters and more particularly to the seed dropping means therefor.

An important object of this invention is to provide a planter attachment having means to operate the seed dropping means without the necessity of employing the usual wire with the buttons adapted to operate the seed dropping mechanism.

A further object is to provide a planter attachment having novel means whereby the same may be elevated or moved to its inoperative position when the end of a row is reached so that the planter may be conveniently turned around.

Other objects and advantages of the invention will be apparent during the course of the following description.

In the accompanying drawing:

Figure 1 is a plan view of the attachment applied.

Figure 2 is a vertical sectional view taken on line 2—2 of Figure 1.

Figure 3 is a detail side elevation of a rod embodied in the invention.

Figure 4 is a detail sectional view illustrating a bearing embodied in the invention.

Figure 5 is a vertical transverse sectional view through the bearing illustrated in Figure 4.

Figure 6 is a detail transverse sectional view through a disk embodied in the invention, and Figure 7 is a section on line 7—7 of Figure 1.

In the drawing the numeral 5 generally designates a planter frame while the numeral 6 designates a transversely extending squared shaft adapted to be rocked for operating the seed dropping mechanism which may be of the usual type.

Bearings 8 are mounted upon the shaft 6 adjacent the ends of the same and are composed of pairs of sections, one section of each bearing being provided with rearwardly directed rods 9 to which arms 10 are connected by means of fastening devices 11. The arms 10 are composed of pairs of sections having their ends overlapped and adjustably connected by fastening devices 12. By adjustably connecting the sections of the arms 10 the length of the several arms may be varied as the occasion requires.

The rear portions of the arms 10 are as illustrated in Figure 5 provided with forked members 14 to which bearing casings 16 are connected by means of bolts 18. The bearing casings 16 of which there are two receive pairs of bearings 19, the said bearings 19 being provided with squared bores for the reception of a shaft 20. The end portions of the bearings 19 are provided with enlargements 21 for engagement with the ends of the bearing casings and the said enlargements are provided with set screws 22 engaging the shaft 20 so as to prevent endwise movement of the bearings. It is thus seen that the squared shaft 20 is rotatably supported so that as the feet or shoes 25 of the wheels 26 engage the ground as the shaft is rotated.

The wheels 26 consist of hubs 28 having pairs of outwardly directed flanges 29 between which the inner portions of telescopic spokes 30 are received. The spokes 30 are composed of interfitting sections having means whereby the same may be adjustably connected so that the diameter of the wheels may be regulated.

The shoes 25 of the wheels are curved transversely and are provided with rearwardly directed flanges 32 constituting a means for preventing the shoes from embedding themselves in loose earth as the wheels are rotated. Suitable wear preventing plates 33 may be secured to the outer sides of the shoes and are preferably formed from case hardened metal.

The intermediate portion of the squared shaft 20 is provided with a disk 35 composed of a hub having an outwardly directed flange 36 to which the spaced sections 37 of the disk are connected by means of bolts 38. By connecting the disks 37 to opposite sides of the flange 36 a space is provided for the reception of the branches 40 and 41 of an operating arm 42. Branch 40 being an extension of arm 42 while branch 41 is pivoted to the arm 42 as at 41'. The sections 37 have their edge portions connected by bolts 44 which periodically engage the branches 40 and 41 for operating the same. Spacing devices in the nature of collars 46 are arranged on the bolts or pins 44 and serve to maintain the sections 37 in spaced relation. The pins 44 may be extended through any of the spaced openings in the sections 37 so that the arms 40 and 41 may be operated either early or late with respect to the wheels 26.

As illustrated in Figure 2 the forward portion of the arm 42 which, incidentally, is adjustable in length, is provided with a pair of cross heads 49 and 50, the said cross heads being joined with upper and lower links 52. The connection between the cross heads and the links is sufficiently free to permit of a slight movement between the arm 42 and the links when the wheels encounter inequalities in the field.

The forward portions of the links are connected to the operating lever 56 of the shaft 6 which as previously stated is connected to the seed dropping mechanism of the planter.

In operation, the wheels 26 are rotated for operating the squared shaft 20 whereupon the disk 35 is rotated. As illustrated in Figure 2, the upper branch 40 which is T-shaped in cross section is partly received in the space between the sections 37 and is periodically engaged by the pins 44 and more particularly by the spacing collars 46 which surround the pins. The lower branch 41 is also T-shaped in cross section and is provided with a notch 60 which as illustrated in Figure 3 is adapted to receive one of the pins 44 so as to establish a driving connection between the disk 35 and the arm 42. When this driving connection between the disk 35 and the arm 42 is established the arm 42 is drawn rearwardly for operating the seed dropping mechanism against the tension of a spring 62 connected to the lower end of the lever 56.

As the disk 35 continues to rotate, one of the pins 44 is engaged with a knob 66 formed on the branch 41 whereupon the pin 44 in the notch 60 is released. When the pin 44 is thus released from the notch 60 the rearward movement of the arm 42 discontinues and the spring 62 will return the arm 42 so that another pin 44 will engage in the notch 60 in the branch lever 41. The arms 40 and 41 are held in engagement with the disk by means of a coil spring 74 secured to the rear terminal portions of the arms.

The arms 10 which form a supporting means for the rear axle 20 may be elevated for disengaging the wheels from the ground by the operation of a lever 76 secured to a transversely extending shaft 77 which in turn is suspended from the frame 5 by means of U-bolts 78. The operation of the lever 76 rocks the shaft 77 so that a pair of lifting rods 79 will be operatively engaged with the arms 10. The rods 79 are provided with slots receiving the arms 10 and when the rods are elevated the arms will be engaged with the lower ends of the slots whereby the arms and the wheels will be elevated. The arms 10 are prevented from lateral movement by engagement with the lifting rods 79.

When the lever 76 is operated the same is held in position by means of a rack 80 having teeth engaged with the lower terminal portion 81 of the lever. The upper portion of the rack 80 is provided with a pedal 82 adapted to be engaged by the foot of the operator so that the rack may be released from engagement with the angularly extended lower end portion of the lever 76.

When the operator desires to disengage the wheels from the ground he merely operates the lever 76 and consequently elevates the arms 10 and the wheels 25.

Having thus described the invention, what is claimed is:

1. A movement for planters comprising a shaft, means for rotating said shaft, a series of pins carried by said shaft and being adapted to be rotated thereabout as said shaft is rotated, an arm provided with a notch adapted to receive said pins, said arm being arranged in the path of movement of said pins to cause the arm to be moved by said pins to disengage the notch from the pins as the shaft rotates, and spring means for normally holding said arm in engagement with said pins.

2. A movement for planters comprising a shaft, means for rotating said shaft, a pair of spaced disks secured to said shaft, pins disposed between said disks at spaced intervals, an arm provided with a notch adapted to receive said pins so as to cause end movement of said arm during movement of said pins, a knob formed on said arm and arranged in the path of travel of said pins so as to disengage said notch from said pins after said arm has been moved rearwardly, and spring means for normally holding said arm in engagement with said pins.

3. A device of the character described comprising a shaft, means for rotating said shaft, a pair of spaced disks secured to said shaft, pins disposed between said disks and carried thereby at spaced intervals, a movable member, an arm attached to said movable member, a branch pivotally connected to said arm and having a notch therein adapted to receive said pins so as to cause end movement of said branch and arm during rotation of said disks, said branch being arranged in the path of movement of said pins to cause the same to be swung on its pivot to disengage the notch from the pins after said branch has been moved rearwardly, and spring means for normally holding said branch in engagement with the pins.

4. A device of the character described comprising a shaft, means for rotating said shaft, a disk secured to said shaft and comprising a pair of spaced sections, spaced pins carried by said sections around the periphery of same, a movable member, an arm having one end adjustably connected to said movable member, a branch pivotally connected to said arm and provided with a notch adapted to receive said pins for causing end movement of said arm as said disk rotates, a knob formed on said branch and arranged in the path of travel of said pins for swinging said branch on its pivot to disengage said notch from said pins after the arm and branch have been moved by said pins, and spring means for holding said branch and said arm in engagement with said pins between the spaced sections.

5. A device of the character described comprising a shaft, means for rotating said shaft, a disk secured on said shaft and comprising a pair of spaced sections, spaced pins connecting said sections around the periphery of same, a movable member, an arm adjustably connected at one end to said movable member and having the opposite end disposed between said sections and in engagement with said pins, a branch pivotally connected to said arm and having a notch therein for receiving said pins, said branch being adapted to be disposed on the opposite side of said shaft from that of said arm, means for holding said arm and said branch between said spaced sections and in engagement with said spaced pins, and means for releasing said pins from engagement with said notch upon rotation of said disk.

6. A device of the character described comprising a shaft, means for rotating said shaft, a series of pins carried by said shaft in spaced parallel relation therewith and adapted to rotate with said shaft, a movable member, an arm adjustably connected with said arm at one end and having its opposite end in engagement with said pins, a branch pivotally connected to said arm and having a notch therein for receiving said pins so as to cause said branch and arm to be moved endwise by the pins during rotation of the shaft, said arm being arranged on the opposite side of said series of pins from the branch, a contractile spring connected to the end of said arm and to the end of said branch for holding said arm and branch in engagement with said pins, and means adapted to be engaged by said pins during rotation of the shaft for disengaging said notch from said pins after the branch and arm have been moved by the pins.

In testimony whereof, I have affixed my signature.

JASPER R. LEWIS.